US007117384B2

(12) United States Patent
Chen et al.

(10) Patent No.: US 7,117,384 B2
(45) Date of Patent: Oct. 3, 2006

(54) TIMING METHOD AND APPARATUS FOR DIGITAL LOGIC CIRCUITS

(75) Inventors: Jin-Ru Chen, TaiChung (TW); Chun-Feng Liu, Taipei (TW); Chang-Lien Wu, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 554 days.

(21) Appl. No.: 10/424,903

(22) Filed: Apr. 29, 2003

(65) Prior Publication Data

US 2003/0204764 A1 Oct. 30, 2003

(30) Foreign Application Priority Data

Apr. 30, 2002 (TW) .............................. 91108902 A

(51) Int. Cl.
*G06F 1/04* (2006.01)

(52) U.S. Cl. ...................................... 713/600; 713/500

(58) Field of Classification Search ................ 713/600, 713/500

See application file for complete search history.

(56) References Cited

U.S. PATENT DOCUMENTS 5,630,109 A * 5/1997 Staiger ....................... 713/501
5,812,834 A * 9/1998 Suzuki ....................... 713/502
5,933,344 A * 8/1999 Mitsuishi et al. ............. 700/13
6,026,497 A * 2/2000 Myszewski ................. 713/502
6,597,735 B1 * 7/2003 Baba .......................... 375/238
6,760,799 B1 * 7/2004 Dunlap et al. ............. 710/260
6,839,654 B1 * 1/2005 Rollig et al. ................ 702/178
2003/0084214 A1 * 5/2003 Dunlap et al. ................ 710/52
2003/0098730 A1 * 5/2003 Miyazaki et al. ........... 327/158
2004/0240388 A1 * 12/2004 Albion et al. ............... 370/252

FOREIGN PATENT DOCUMENTS

JP 01-173916 * 7/1989
JP 08-251517 * 9/1996

* cited by examiner

*Primary Examiner*—Chun Cao
(74) *Attorney, Agent, or Firm*—Troxell Law Office, PLLC

(57) ABSTRACT

A differentiated granularity timing apparatus and a method to provide various flexible timing granularities without requiring much memory space and complex circuit design are disclosed. The differentiated granularity timing apparatus of the present invention comprises a differentiated granularity timing unit, a comparing unit, an adder and a buffer. The buffer is for storing a time value. The comparing unit further comprises a comparator and a plurality of predetermined time interval values stored therein. The comparator is for outputting a control signal according to the time value. The differentiated granularity timing unit further comprises a multiplexer and a plurality of timers. Each timer is for providing a timing signal with different timing granularities respectively. The multiplexer is for outputting one of the timing signals with the corresponding timing granularity according to the control signal.

20 Claims, 1 Drawing Sheet

TIMING METHOD AND APPARATUS FOR DIGITAL LOGIC CIRCUITS

BACKGROUND OF THE INVENTION

1. Field of the Invention

The present invention generally relates to a timer, more particularly, to a differentiated granularity timer apparatus and the method thereof.

2. Description of the Prior Art

The timer plays an important role in many digital logical circuits for network application. Especially, for controlling the time needed to store the information in a network system, timer is an indispensable component in so-called garbage collection. for example, in the OSI Standard, the record tables, such as the Forwarding Table of the Layer 2, the routing Table of the Layer 3, and the NAPT Table of the Layer 4, all have to use timer mechanism in order to enable the ASIC to age out the expired information. In the conventional art, a time value T is written into a buffer or a memory. The timing operation performed by the timer is to execute a counting process in every U second(s) (assuming the timer is designed to perform timing operation with the timing granularity of U seconds).

When a timer performs a timing operation from 0 second to T second(s) or in a reverse manner from T second(s) to 0 second, a timeout operation will be triggered. In such case, the larger the time value T is needed, the more space the buffer or the memory must provide. For example, if the timing granularity is one second, the range of the time value is from one second to 24 hours (86,400 seconds), at least 17 bits are required. When many timers operate at the same time, the total memory space required for timing operation will be extremely huge, and the circuit relative to the timing operation will be complex. The difficulties and cost of designing and manufacturing the ASIC will thus be increased.

In the conventional art, the time value T stored in the buffer or the memory is in the form of equal time interval, as described above. For example, if 6 bits are used for storing the time value and the timing granularity is one second, the maximum time value that can be expressed by 6 bits will be 63 seconds ($2^6=64$, the $64^{th}$ second is for timeout).

However, a precise timing mechanism is not always necessary. Sometimes, a small amount of inaccuracy is also acceptable. If a timing mechanism with minor inaccuracy but not with 100% precision is acceptable, there will be a room for improving the conventional timer. The acceptable inaccuracy referred herein is subject to the value and the range of the time value.

Moreover, in many cases of timer designs, since not every timing granularity will be used for timing operation, the timer can be designed to be precise in some specific timing granularities. Even if the time no granularities not being used are with more inaccuracy, the precision and the accuracy of the timer are not affected.

SUMMARY OF THE INVENTION

In order to overcome the disadvantages described above in the conventional art, the object of the present invention is to provide a differentiated granularity timing apparatus and a method to provide various flexible timing granularities without requiring much memory space and complex circuit design.

The differentiated granularity timing apparatus of the present invention comprises a differentiated granularity timing unit, a comparing unit, an adder and a buffer. The buffer is for storing a time value. The comparing unit further comprises a comparator and a plurality of predetermined time interval values stored therein. The comparator is for outputting a control signal according to the time value. The differentiated granularity timing unit further comprises a multiplexer and a plurality of timers. Each timer is for providing a timing signal with different timing granularities respectively. The multiplexer is for outputting one of the timing signals with the corresponding timing granularity according to the control signal.

In one embodiment of the present invention, the timers of the differentiated granularity timing unit are connected serially. Each timer has a predetermined maximum counting value. An external reference clock is connected to one of the timers and an input end of the multiplexer. These timers are for outputting timing signals with different timing granularities to the multiplexer. The multiplexer is for outputting timing signals with one of the timing granularities according to a control signal outputted from the comparator.

The comparing unit comprises the comparator and the predetermined time interval values stored therein. The function of the comparator is to compare the time value stored in the buffer with the predetermined time interval values, and output the control signal to the multiplexer according to the result of the comparison.

In one embodiment of the present invention, one end of the adder is for receiving the timing value stored in the buffer, and another end is for receiving a default value (−1). When the adder executing the adding operation, the current time value will be decreased by one and written back to the buffer. A descending timing operation is accomplished.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

Figure 1:
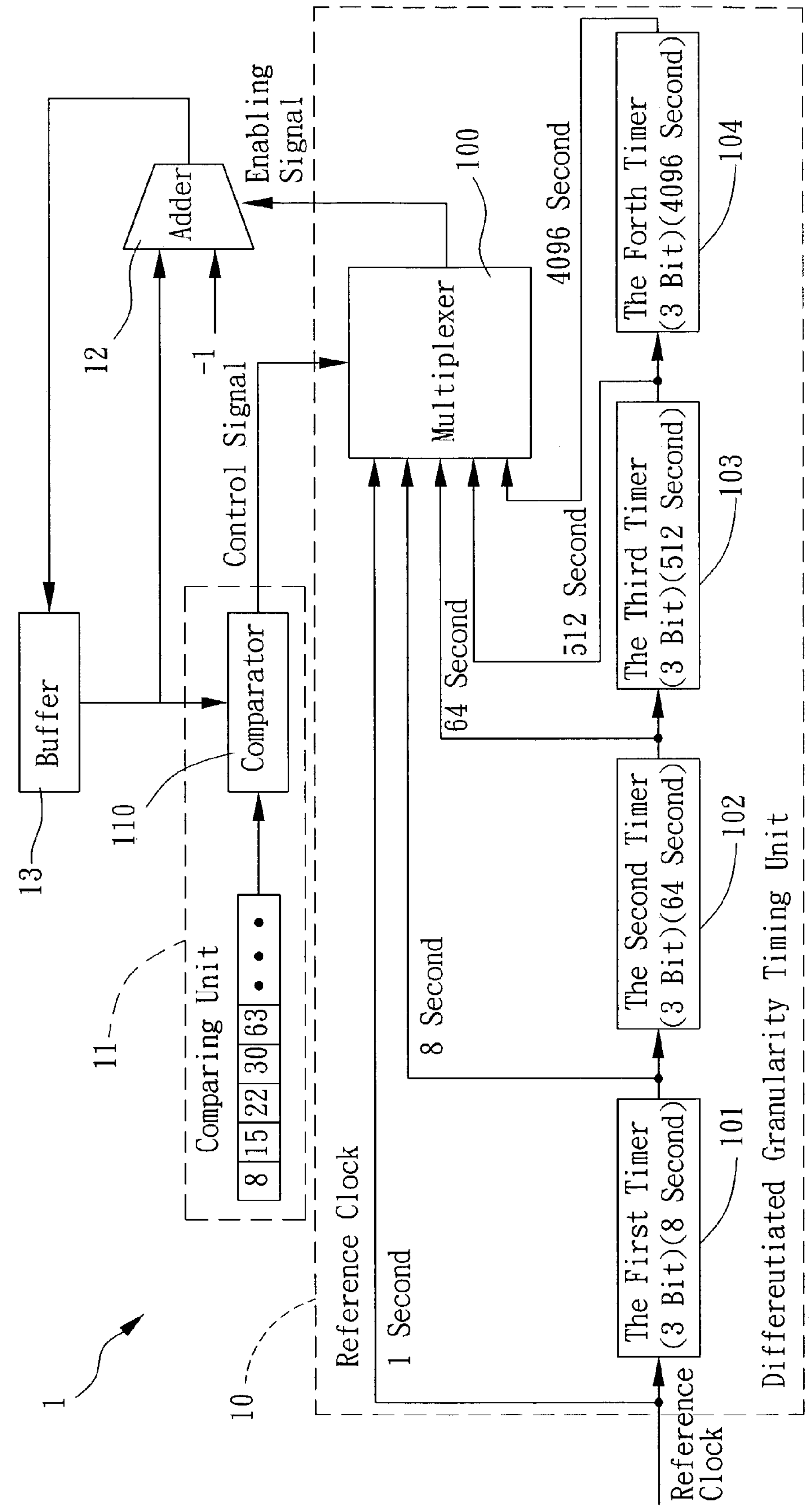
FIG. 1 is a schematic block diagrams showing a differentiated granularity timing device in accordance with the present invention.

The differentiated granularity timing apparatus disclosed in the present invention is to provide various flexible timing granularities for the timer. In this manner, the timer can perform timing operation with various flexible timing granularities. The timing granularities are set in advance.

Please refer to Table 1, the time value of the timer can be divided into several groups (S) according to different timing granularities, as shown in FIG. 1. According to Table 1, the $k^{th}$ group contains $S_k$ time values, and the timing granularity of the $k^{th}$ group is $G_k$ second. For example, $S_1$=8, $S_2$=7, $S_3$=7, $G_1$=1, $G_2$=8, and $G_3$=64, as shown in Table 1. The first group $S_1$ contains the time values 0~8. Since the timing granularity of the first group $G_1$ is 1 second, the representing values correspond to the time values are 0~8 respectively. The second group $S_2$ contains the time values 9~15. Since the timing granularity of the second group $G_2$ is 8 seconds, the representing values correspond to the time values 9~16 are 16, 24, 32, 40, 48, 56, and 64 respectively. The third group $S_3$ contains the time values 16~22. Since the timing granularity of the third group $G_3$ is 64 seconds, the representing values correspond to the time values 16~22 are 128, 192, 256, 320, 384, 448, and 512 respectively. The fourth group $S_4$ contains the time values 23~29. Since the timing granularity of the fourth group $G_4$ is 512 seconds, the representing values correspond to the time values 23~29 are 1024, 1536, 2048, 2056, 3072, 3584, and 4096 respectively, and so on. In the present invention, 6-bits will be enough for representing the time values of the timer instead of 17-bits.

TABLE 1

Time value vs. Representing Value

| Group | Time value (T) | Repre-senting Value | Granularity (G) (Sec.) | Timing | Maximum Error rate (%) |
|---|---|---|---|---|---|
| $S_1$ | 0 | 0 | — | 0 sec | 0 |
| | 1 | 1 | 1 | 1 sec | 100 |
| | 2 | 2 | 1 | 2 sec | 50 |
| | 3 | 3 | 1 | 3 sec | 33 |
| | 4 | 4 | 1 | 4 sec | 25 |
| | 5 | 5 | 1 | 5 sec | 20 |
| | 6 | 6 | 1 | 6 sec | 16 |
| | 7 | 7 | 1 | 7 sec | 14 |
| | 8 | 8 | 1 | 8 sec | 12 |
| | 9 | 16 | 8 | 16 sec | 50 |
| | 10 | 24 | 8 | 24 sec | 33 |
| | 11 | 32 | 8 | 32 sec | 25 |
| | 12 | 40 | 8 | 40 sec | 20 |
| | 13 | 48 | 8 | 48 sec | 16 |
| | 14 | 56 | 8 | 56 sec | 14 |
| | 15 | 64 | 8 | 1 min | 12 |
| $S_3$ | 16 | 128 | 64 | 2 min | 50 |
| | 17 | 192 | 64 | 3 min | 33 |
| | 18 | 256 | 64 | 4 min | 25 |
| | 19 | 320 | 64 | 5 min | 20 |
| | 20 | 384 | 64 | 6 min | 16 |
| | 21 | 448 | 64 | 7 min | 14 |
| | 22 | 512 | 64 | 8.5 min | 12 |
| $S_4$ | 23 | 1024 | 512 | 17 min | 50 |
| | 24 | 1536 | 512 | 25.5 min | 33 |
| | 25 | 2048 | 512 | 34 | 25 |
| | 26 | 2560 | 512 | 42.5 min | 20 |
| | 27 | 3072 | 512 | 51 min | 16 |
| | 28 | 3584 | 512 | 60 min | 14 |
| | 29 | 4096 | 512 | 1 hr | 12 |
| $S_5$ | 30 | 8192 | 4096 | 2 hr | 50 |
| | 31 | 12288 | 4096 | 3 hr | 33 |
| | 32 | 16384 | 4096 | 4.5 hr | 25 |
| | 33 | 20480 | 4096 | 5.5 hr | 20 |
| | 34 | 24576 | 4096 | 6.5 hr | 16 |
| | 35 | 28672 | 4096 | 8 hr | 14 |
| | . | . | . | . | . |
| | . | . | . | . | . |
| | . | . | . | . | . |
| | 62 | 135168 | 4096 | 37.5 hr | 3 |
| | 63 | 139264 | 4096 | 38.5 hr | 2 |

Assuming a Time value is x and x belongs to group y $$\left(\sum_{i=1}^{y-1} S_i + 1 \le x \le \sum_{i=1}^{y} S_i\right),$$

in the present invention, before x descending to $$\sum_{i=1}^{y-1} S_i + 1,$$

the timer is triggered every $G_y$ seconds to deduct 1 from x. When x $$x < \sum_{i=1}^{y-1} S_i + 1,$$

the frequency changes to $G_{y-1}$ seconds, meaning the timer is triggered every $G_{y-1}$ seconds to deduct 1 from x. Such differentiated granularity timing method causes a little inaccuracy when the group which x belongs changes. However, if the time value is set in some specific values, such as the value close to the maximum value $$\left(\sum_{i=1}^{k} S_i\right)$$

of each group (please refer to FIG. 1), Maximum error rate of the time value is decreased and the precision is acceptable. For example, when an entry needs to be timeout after 8192 seconds (where the Maximum Difference is around 50% in Table 1), the entry will be setup to T=30. If the aging counter has just triggered the 4096-second timer after the entry being set up, the timer will descend to 0 after 8192 seconds.

The feature of the present invention is that there are a plurality of timers with different timing granularities respectively. When more than one timers need to be activated by the aging counter in the same time, only the timer with the maximum timing granularity is triggered while other timers with relatively smaller timing granularities are not triggered. For instance, there are three timers with different timing granularities, 1 second, 8 seconds and 64 seconds respectively. When the aging counter is set to be 128, only the timer with timing granularity of 64 seconds will be activated while the timers with timing granularities of 8 seconds and 1 second are not triggered.

According to the above description, for the $k_{th}$ group $S_k$, the timer will be triggered $S_k$ times, which takes $(S_k+1)\times G_k$ seconds to accomplish. However, when the ratio of the timing granularity of two adjacent groups $(G_{i+1}/G_i)$ is fixed to be M. (please refer to Table 1, in this embodiment, M=8) and the number of the time values of $k_{th}$ group $S_k$ is set to be M-1. In this manner, it takes $M*G_i(=G_{i+1})$ seconds, which is the same with the timing granularity of the $(k+1)_{th}$ group, to accomplish the operation of the timer corresponding to the $k_{th}$ group. For example, according to Table 1, if an entry set to be age out after 4.5 hours, the timers with 4096 seconds timing granularity will be triggered 3 times, the timers with 512 seconds timing granularity will be triggered 7 times, the timers with 64 seconds timing granularity will be triggered 7 times, the timers with 8 seconds timing granularity will be triggered 7 times, and the timers with 1 second timing granularity will be triggered 8 times.

Please refer to FIG. 1, FIG. 1 is a schematic block diagram of the differentiated granularity timing apparatus in accordance with the present invention. The differentiated granularity timing apparatus for the timer comprises a differentiated granularity timing unit 10, a comparing unit 11, an adder 12 and a buffer 13. The differentiated granularity timing unit 10 further comprises a multiplexer 100 and a plurality of timers. In this embodiment, the timers include the first timer 101, the second timer 102, the third timer 103, and the fourth timer 104. These timers 101, 102, 103 and 104 provide timing signals with different timing granularities respectively to the multiplexer 100. The multiplexer 100 is for outputting one of the timing signals to the adder 12 based on a control signal outputted from the comparing unit 11.

Each timer in the differentiated granularity timing unit 10 will provide timing signals with different timing granularities respectively. In one embodiment of the present invention, the first timer 101, second timer 102, third timer 103, and fourth timer 104 are connected serially. Each timer has a predetermined maximum counting value. For example, the first timer 101 has a 3-bit counting value and the timing signal outputted by the first timer 101 has the timing granularity of 8 seconds. After 8 seconds, the first timer 101 outputs a signal to the second timer 102. The second timer 102 has a 3-bit counting value and the timing signal outputted by the second timer 102 has the timing granularity of 64 seconds. After 64 seconds, the second timer 102 outputs a signal to the third timer 103. The third timer 103 also has a 3-bit counting value and the timing signal outputted by the third timer 103 has the timing granularity of 512 seconds. After 512 seconds, the third timer 103 outputs a signal to the fourth timer 104. The fourth timer 104 also has a 3-bit counting value and the timing signal outputted by the fourth timer 104 has the timing granularity of 4096 seconds. After 4096 seconds, the fourth timer 104 outputs a signal to the multiplexer 100. The first timer 101 is also connected to an external reference clock with clock cycle of one second. The external reference clock is also connected to an input end of the multiplexer. These timers output the timing signals to the multiplexer 100. A controlling signal outputted from the comparator 110 is for controlling the multiplexer 100 to select one of the timing signals outputted from the timers 101~104. It should be noted that the timers may not necessary be serial-connected. In another preferred embodiment, the timers 101~104 may not be serial-connected and the timers 101~104 can output the timing signals with different timing granularities independently.

The comparing unit 11 comprises a comparator 110 and a plurality of predetermined time interval values stored herein. The predetermined time interval values can be set in advance according to the time interval needed for timing operation. For example, the time interval values can be set to be 8, 15, 22, 30, and so on. The buffer 13 is for store a time value. The function of the comparator is to compare the time value stored in the buffer with the predetermined time interval values, and output the control signal to the multiplexer according to the result of the comparison.

In the embodiment of the present invention, one end of the adder is for receiving the timing value stored in the buffer, and another end is for receiving a default value (−1). When the adder executing the adding operation, the current time value will be decreased by one and written back to the buffer. A descending timing operation is thus accomplished.

It should be noted that the time interval values, the timing granularities of the timing signals outputted by the timers 101 to 104, and the default value received by the adder are all programmable.

According to the disclosure described above, only the specific time interval values are needed, the space of the memory or the buffer for storing the specific time interval values can be decreased compared with the conventional art. The circuit relative to the timing operation can thus be simplified. The cost for circuit designing and manufacturing can be lowered.

It is noted that, although the above illustrated embodiment employs a deducting procedure to calculate the time value, however, it also can be performed by calculating the time value in the ascending (progressively increasing) manner. Since the principle and technique are similar, therefore no further description to the ascending timing method will be provided. The designer can make his/her own design choice to perform either the ascending or descending timing method based on real needs. Moreover, according to the various columns such like Group, Time value, Representing Value, Granularity, Timing and Maximum Difference shown in Table 1, all values shown in these columns are merely for representing a preferred embodiment of the present invention only. In real practice, the designer can modify and change any of these values. That is, the Granularity values can be differentiated and the Representing Values can be flexibly designed.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

The invention claimed is:

1. A timing method, comprising the following steps:

(a) selecting a timing signal from a plurality of predetermined timing signals according to a time value, wherein each of the predetermined timing signals corresponds to a predetermined time granularity;

(b) adjusting the time value in a descending/ascending manner after the predetermined time granularity of the selected timing signal is passed;

(c) repeating steps (a) and (b) till the time value is equal to a predetermined value.

2. The timing method as recited in claim 1, wherein the predetermined time granularities of the predetermined timing signals have multiple relationships in between.

3. The timing method as recited in claim 1, wherein each of the predetermined time granularities of the predetermined timing signals is different.

4. A timing apparatus, comprising:

a comparing unit for outputting a control signal according to a time value;

a differentiated timing unit for outputting a timing signal with a timing granularity, wherein the timing granularity corresponds to the control signal; and a calculating unit for descending/ascending the time value according to the timing signal.

5. The timing apparatus as recited in claim 4, wherein said calculating unit is an adder for descending the time value.

6. The timing apparatus as recited in claim 4, wherein said differentiated timing unit further comprises:

a plurality of timers for outputting a plurality of timing signals, wherein the timing signals are corresponded to predetermined timing granularities respectively; and a multiplexer for selecting one of the timing signals according to the control signals, and outputting the timing signal with the timing granularity corresponded to the selected timing signal;

wherein the predetermined timing granularities of the timing signals are not the same.

7. The timing apparatus as recited in claim 6, wherein the timers are serially connected.

8. The timing apparatus as recited in claim 6, wherein the predetermined timing granularities have multiple relationships in between.

9. The timing apparatus as recited in claim 6, wherein each of the predetermined timing granularities is different.

10. The timing apparatus as recited in claim 6, wherein the predetermined timing granularities are programmable.

11. A timing apparatus, comprising:

a comparing unit for outputting a control signal according to a time value;

a differentiated timing unit for outputting an timing signal with a timing granularity, wherein the timing granularity is corresponded to the control signal; and an adder for outputting an adjusted time value to replace the time value according to the timing signal.

12. The timing apparatus as recited in claim 11, wherein the adjusted timing value is equaled to the time value minus 1.

13. The timing apparatus as recited in claim 11, wherein said differentiated timing unit further comprises:

a plurality of timers for outputting a plurality of timing signals, wherein the timing signals are corresponded to predetermined timing granularities respectively; and a multiplexer for selecting one of the timing signals according to the control signal, and outputting the timing signal with the timing granularity corresponded to the selected timing signal;

wherein the predetermined timing granularities of the timing signals are not the same.

14. The timing apparatus as recited in claim 13, wherein the timers are serially connected.

15. The timing apparatus as recited in claim 13, wherein the predetermined timing granularities have multiple relationships in between.

16. The timing apparatus as recited in claim 13, wherein each of the predetermined timing granularities is different.

17. The timing apparatus as recited in claim 13, wherein the predetermined timing granularities are programmable.

18. A timing method comprising:

comparing a time value with at least one predetermined time interval value and generating a comparison result;

generating a control signal according to the comparison result;

outputting a timing signal according to the control signal; and descending/ascending the time value according to the timing signal;

wherein the timing signal corresponds to one of a plurality of different granularities.

19. The timing method of claim 18, wherein the predetermined time interval value is programmable.

20. The timing method of claim 18, wherein the timing signal is generated according to a reference clock signal and the control signal.

* * * * *